United States Patent
Oberman (10) Patent No.: US 10,042,795 B2
(45) Date of Patent: Aug. 7, 2018

(54) SCSI COMMAND JAMMER (71) Applicant: Red Hat, Inc., Raleigh, NC (US)

(72) Inventor: Laurence Oberman, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 201 days.

(21) Appl. No.: 14/863,490

(22) Filed: Sep. 24, 2015

(65) Prior Publication Data

US 2017/0091129 A1  Mar. 30, 2017

(51) Int. Cl.
  *G06F 8/20* (2018.01)
  *G06F 13/36* (2006.01)
  *G06F 13/40* (2006.01)
  *G06F 13/42* (2006.01)

(52) U.S. Cl.
  CPC .......... *G06F 13/36* (2013.01); *G06F 13/4068* (2013.01); *G06F 13/42* (2013.01)

(58) Field of Classification Search
  None
  See application file for complete search history.

(56) References Cited

U.S. PATENT DOCUMENTS

| 6,892,254 B2 * | 5/2005 | Suzuki | G06F 13/102 710/15 |
| 7,260,636 B2 * | 8/2007 | Blumenau | H04L 63/08 709/227 |
| 7,376,546 B2 * | 5/2008 | Dominguez | G06F 11/3672 703/14 |
| 8,181,239 B2 * | 5/2012 | Pandya | H04L 63/0218 370/469 |

OTHER PUBLICATIONS

CMD Technology, Inc., "CRD-5500 SCSI Raid Controller User's Manual", Nov. 21, 1996, 92 pages.
Hewlett-Packard, "Hewlett-Packard Journal" vol. 47, No. 5, Oct. 1996, pp. 1-112.
"Free Electrons—Electrons Libres—Embedded Linux Experts", http://elixir.free-electrons.com/linux/v4.13-rc4/source/drivers/scsl/gla2xxx/gla_target.c, 84 pgs. (Aug. 11, 2017).

* cited by examiner

Primary Examiner — Cheng-Yuan Tseng
(74) Attorney, Agent, or Firm — Haynes and Boone, LLP (57) ABSTRACT Methods, systems, and computer program products are included for selecting, on the server computer, a selected host number that corresponds to the client computer; receiving, by the server computer, a network communication that includes a SCSI command, the network communication originating from the client computer; reading, by the server computer, a host number from the SCSI command; identifying, by the server, that the selected host number corresponds to the host number from the SCSI command; and preventing, by the server, the SCSI command from reaching a block I/O layer of the server computer.

20 Claims, 4 Drawing Sheets

SCSI COMMAND JAMMER

BACKGROUND

The Small Computer System Interface (SCSI) is a standard for connecting and transferring data between computing devices. For example, a conventional use of SCSI is a computer accessing data from disk drives and/or tape drives that are coupled to the computer via SCSI cables.

Another use of SCSI is for a client computer to read from or write to files that are located on storage that is coupled to a networked storage controller device. For example, a server computer that is coupled to a network may be coupled to one or more storage devices. A client computer may connect to the server computer and send commands to the server computer to read and write data.

A conventional transport of SCSI commands over a network may include encapsulating the SCSI commands within another protocol. For example, the SCSI protocol commands may be encapsulated within Fibre Channel and/or TCP/IP protocol. Encapsulating the SCSI command within Fibre Channel and/or TCP/IP packet may be useful, for example, to transport the SCSI command over Fibre Channel and/or TCP/IP networks. SCSI commands may be encapsulated by one or more protocols.

A client computer may include a recovery process to perform error handling corresponding to its SCSI communications. For example, SCSI commands transported over a network may timeout. The recovery process may be configured to identify and respond to the timeout.

Hardware devices have been developed using application-specific integrated circuits that are used to test the recovery process / error handling. Conventionally, these error simulation hardware devices are positioned in-line with the client computer and the server computer in the network, such as between a network switch and client computer, or between a network switch and a server computer. The traditional use of these error simulation hardware devices is to monitor network communications in the network and inject errors into the network communications to simulate error conditions.

BRIEF SUMMARY

According to an example, a computer-implemented method provisioning a logical unit number (LUN) on a server computer; connecting, via a network, the server computer to a client computer; configuring the LUN to be accessible to the client computer; selecting, on the server computer, a selected host number that corresponds to the client computer; receiving, by the server computer, a network communication that includes a SCSI command, the network communication originating from the client computer; reading, by the server computer, a host number from the SCSI command; identifying, by the server, that the selected host number corresponds to the host number from the SCSI command; and preventing, by the server, the SCSI command from reaching a block I/O layer of the server computer.

According to an example, a non-transitory computer-readable medium includes computer-readable instructions, the computer-readable instructions executable by a processor to cause the processor to: configure a LUN corresponding to a server computer to be accessible to a client computer; provide an interface for selecting an identifier associated with a SCSI initiator; receive, via the interface, the selected identifier and store the selected identifier in a memory; receive a SCSI command from the SCSI initiator to access the LUN; read a host number from the SCSI command; match the selected identifier with the host number; and simulate an error corresponding to the SCSI command by blocking the SCSI command.

According to an example, a system includes a processor and a memory. The system further includes a processor and a computer-readable storage medium; a kernel executed by the processor, the kernel including a SCSI target; a host bus adapter to receive a SCSI command via a network, the host bus adapter to pass the SCSI command to the SCSI target; the SCSI target executed by the processor to: receive an identifier corresponding to a SCSI initiator; receive a SCSI command from a SCSI initiator; read a host number from the SCSI command; match the host number with the identifier; and prevent the SCSI command from being passed to a block I/O layer.

BRIEF DESCRIPTION OF THE DRAWINGS

Various examples of the present disclosure will be understood more fully from the detailed description given below and from the accompanying drawings of various examples of the disclosure.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
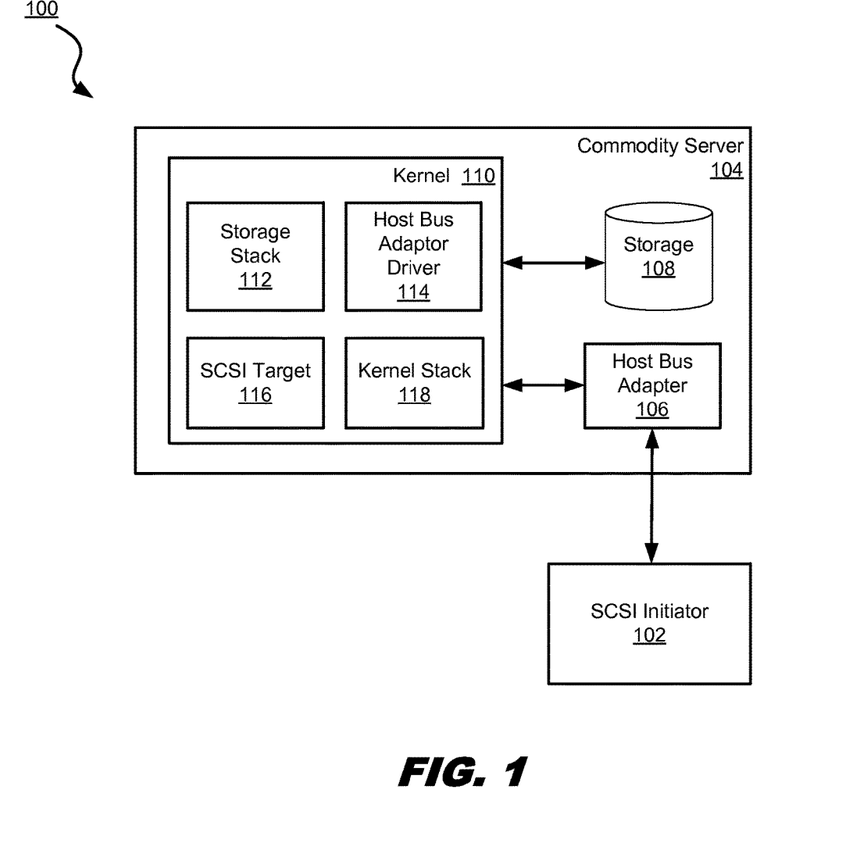
FIG. 1 is a block diagram illustrating a system architecture for processing SCSI commands, in accordance with various examples of the present disclosure.

FIG. 1 illustrates a system architecture 100 for processing SCSI commands, in which examples of the present disclosure can be implemented.

System architecture 100 includes a SCSI initiator 102 and a commodity server 104.

In the present example, SCSI initiator 102 is a client computer device that includes a combination of hardware and software. The SCSI initiator 102 is structured to initiate SCSI communications with commodity server 104. For example, SCSI initiator 102 may include components such as a host bus adaptor (HBA) to connect to a network. SCSI initiator 102 may also include a kernel that includes a host bus adaptor driver operating in initiator mode that communicates SCSI commands to the host bus adaptor. SCSI initiator 102 may also include a Fibre Channel module in the host bus adapter to encapsulate SCSI commands into Fibre Channel frames and/or TCP/IP packets. SCSI 102 initiator may use the host bus adaptor to place the encapsulated SCSI commands on a transport medium. In some examples, SCSI initiator 102 is structured as a computing device such as a desktop computer, laptop computer, or mobile device.

In the present example, commodity server 104 is structured as a server computer device that includes a combination of hardware and software. Commodity server 104 is structured to receive SCSI commands from SCSI initiator 102. Commodity server 104 is also structured to process the received commands, such as by executing the received commands and generating responses to the received commands. Commodity server 104 is also structured to jam SCSI commands, also referred to as blocking, preventing, or discarding the SCSI commands, in order to prevent the SCSI commands from being processed at the block layer of commodity server 104. In some examples, commodity server 104 is structured as a computing device such as a rack mount server, desktop computer, laptop computer, mobile device, and so forth.

SCSI initiator 102 and commodity server 104 may also be referred to as end-points. In the present example, SCSI initiator 102 and commodity server 104 are separated by one or more network devices and transport media. For example, network devices include routers, hubs, and switches. Transport media include, for example, Ethernet cable, Fibre Channel Cable, SCSI cable connectors, wireless signals, and so forth.

In the present example, commodity server 104 is structured with a host bus adapter (HBA) 106. HBA 106 is structured to provide physical connectivity between SCSI initiator 102 and commodity server 104. In some examples, HBA 106 includes a circuit board, microprocessor, Fibre Channel and/or Ethernet port, and firmware for encapsulating and de-encapsulating SCSI communications within other protocols. In the present example, HBA 106 is structured to send and receive SCSI commands, which may be encapsulated by other protocols (such as Fibre Channel, TCP/IP, and so forth), over a network between commodity server 104 and SCSI initiator 102.

In the present example, commodity server 104 is structured with a storage 108. In some examples, storage 108 is one or more hardware storage devices such as hard disk drives, tape drives, and so forth. Storage 108 is structured to be accessed by a block I/O layer of the kernel 110 using block-level communications. Accordingly, the hardware storage devices may be referred to as block devices. Block-level communications include, for example, reading fixed-size chunks of data, referred to as blocks, from the storage 108 and/or writing blocks to the storage 108.

In the present example, kernel 110 is structured with a storage stack 112 that includes components to receive SCSI commands from the HBA 106 and communicates responses to those commands to the HBA 106. Kernel 110 is structured with a HBA driver 114. HBA driver 114 is structured to transmit SCSI I/O requests between the HBA 106 and storage 108. For example, HBA driver 114 is structured to communicate with firmware of the HBA 106 and with storage stack 112 to process SCSI commands and to respond to those commands. In some examples, HBA driver 114 is referred to as running in target mode, meaning that the HBA driver 114 is structured to control the HBA 106 to wait for SCSI commands from a SCSI initiator, and respond to the SCSI commands. The HBA driver 114 may be configured to control the HBA 106 to run in target mode or initiator mode based on commands received from the SCSI target 116.

In the present example, kernel 110 is structured with the SCSI target 116. SCSI target 116 is structured to provide a SCSI target, to which the SCSI initiator 102 may connect. SCSI target 116 may configure the HBA driver 114 to run in target mode, such that the HBA driver 114 controls the HBA 106 to wait to receive SCSI commands.

In the present example, SCSI target 116 is structured to provision logical unit numbers (LUNs), set masking for the LUNs, and provide access control lists (ACLs) for the LUNs. Provisioning LUNs includes, for example, creating LUNs, assigning LUNs to applications, creating volumes, assigning LUNs to the volumes, and so forth. Setting masking for the LUNs includes for example, configuring which SCSI initiators are allowed to view the LUNs. Providing access control lists includes, for example configuring LUNs to be accessed by particular SCSI initiators and not by other SCSI initiators. Configuring LUNs to be accessed may include, for example, configuring one or more types of access such as read and/or write access.

SCSI target 116 is structured to receive a discovery request from SCSI initiator 102 and respond to the discovery request with identification of available LUNs. SCSI target 116 is also structured to receive requests from SCSI initiator 102 to configure LUNs for access by SCSI initiator 102.

In some examples, SCSI target 116 is structured as a LINUX-IO (LIO) Target software module.

In the present example, kernel 110 is structured with a kernel stack 118 that stores data corresponding to kernel processes. Kernel stack 110 may be accessed by, for example, HBA driver 114, SCSI target 116 and storage stack 112 to perform operations corresponding to transporting SCSI commands, performing block I/O to retrieve blocks from storage 108, and responding to the SCSI commands with SCSI responses that include blocks retrieved from storage 108.

Figure 2:
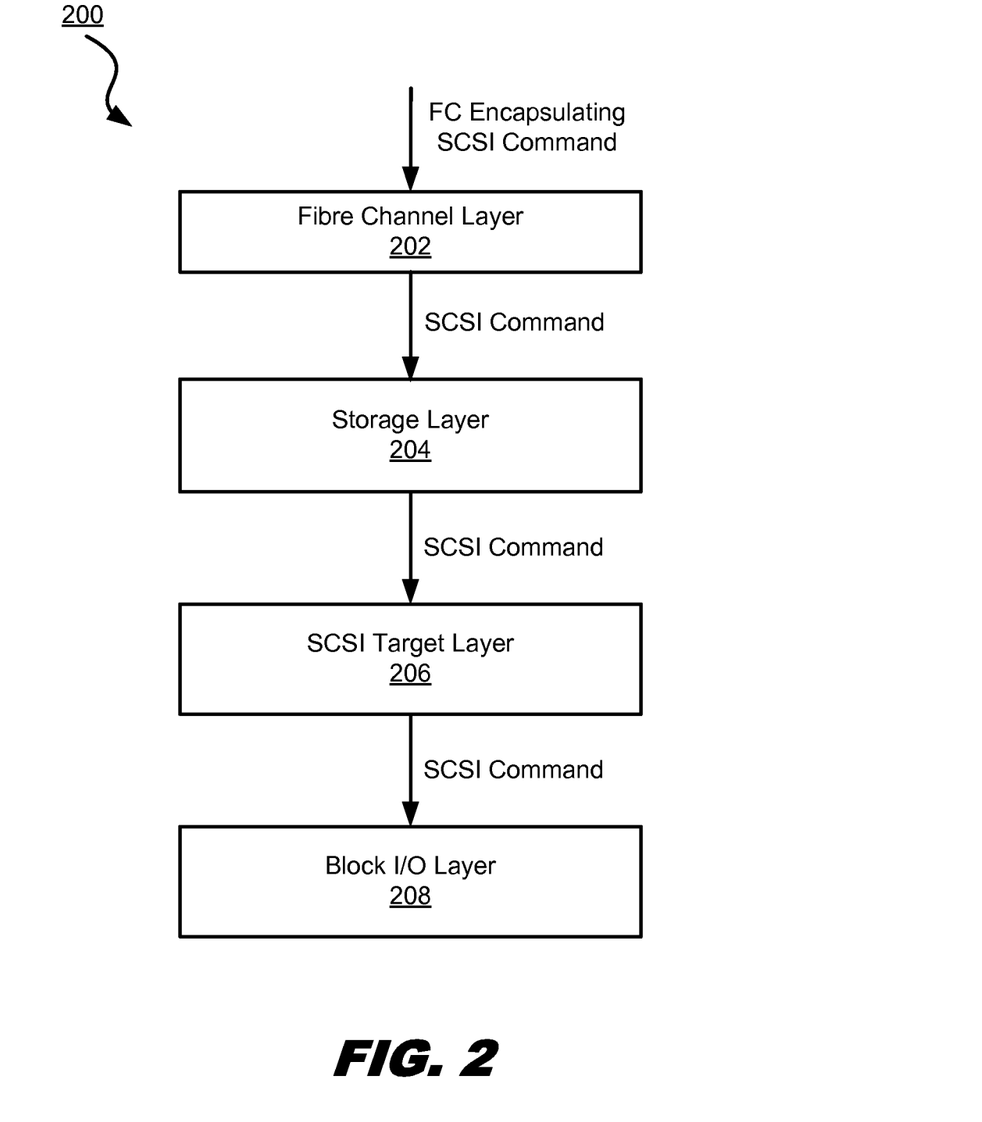
FIG. 2 is a flow diagram illustrating receiving and processing of a SCSI command, in accordance with various examples of the present disclosure.

FIG. 2 is a flow diagram illustrating a method for receiving and processing of a SCSI command, according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof.

At action 202, a Fibre Channel layer receives a SCSI command that is encapsulated in a Fibre Channel frame. In the present example, the Fibre Channel layer includes an HBA device comprising hardware and software-based firmware. In the present example, the HBA is configured at the server endpoint.

In the present example, the SCSI command is sent from a SCSI initiator that is a client endpoint and the SCSI command is received at the HBA at the server endpoint. The SCSI initiator may also be referred to as a client computer device or a client. The SCSI command may be transported over transport media via one or more network devices that are positioned in a network between the server endpoint and the client endpoint. The one or more network devices include, for example, switches, routers, hubs, and so forth. Transport media include, for example, Fibre Channel, Ethernet, and wireless transport media.

In some examples, the SCSI command is encapsulated in a Fibre Channel frame that is encapsulated in an Internet Protocol packet (e.g., TCP/IP). The Fibre Channel layer processes the Fibre Channel frame and/or Internet Protocol packet to de-encapsulate the SCSI command. Once the SCSI command is de-encapsulated, the SCSI command may then passed to the storage layer.

At action 204, storage layer receives the SCSI command from the Fibre Channel layer. The storage layer prepares the SCSI command for further processing, such as by placing the SCSI command in memory location and initiating processing of the SCSI command by one or more kernel methods/functions. In the present example, storage layer interacts with the SCSI target layer 206 to trigger processing of the SCSI command at the SCSI target layer.

At action 206, the SCSI target layer processes the SCSI command received from the storage layer. In the present example, the SCSI target layer processes the command by identifying the host number and LUN associated with the SCSI command, determining whether the host number has access privileges to the LUN, mapping the command to a LUN, and so forth. In the present example, the SCSI target layer is configured with a host number that is to have SCSI commands jammed. The host number associated with the SCSI command may be identified by reading/parsing an address included in the command.

The SCSI target layer compares the host number associated with the SCSI command and the host number that is configured to have SCSI commands jammed. If the host numbers are a match, then the SCSI command is not passed on to the block I/O layer. Jamming the command may also be referred to as blocking the SCSI command or preventing the SCSI command from being passed to the block I/O layer.

If the host numbers are not a match, the SCSI command may be passed on from the SCSI target layer to the block I/O layer. For example, if a SCSI command is a request to read or write to a particular file at a particular LUN, the SCSI target layer may pass the file identifier and a storage volume associated with the LUN to the block I/O layer.

At action 208, the SCSI command is processed at the block I/O layer if the SCSI command was not jammed in block 206. In the present example, the processing is performed by the kernel, which includes a host bus adapter driver and a kernel stack. Block I/O processing includes identifying particular blocks from memory of the storage device corresponding to the file identifier and portion of the storage that is mapped to the LUN. The block I/O layer may then reads from or writes to the blocks of memory in order to perform the request indicated in the SCSI command.

Figure 3:
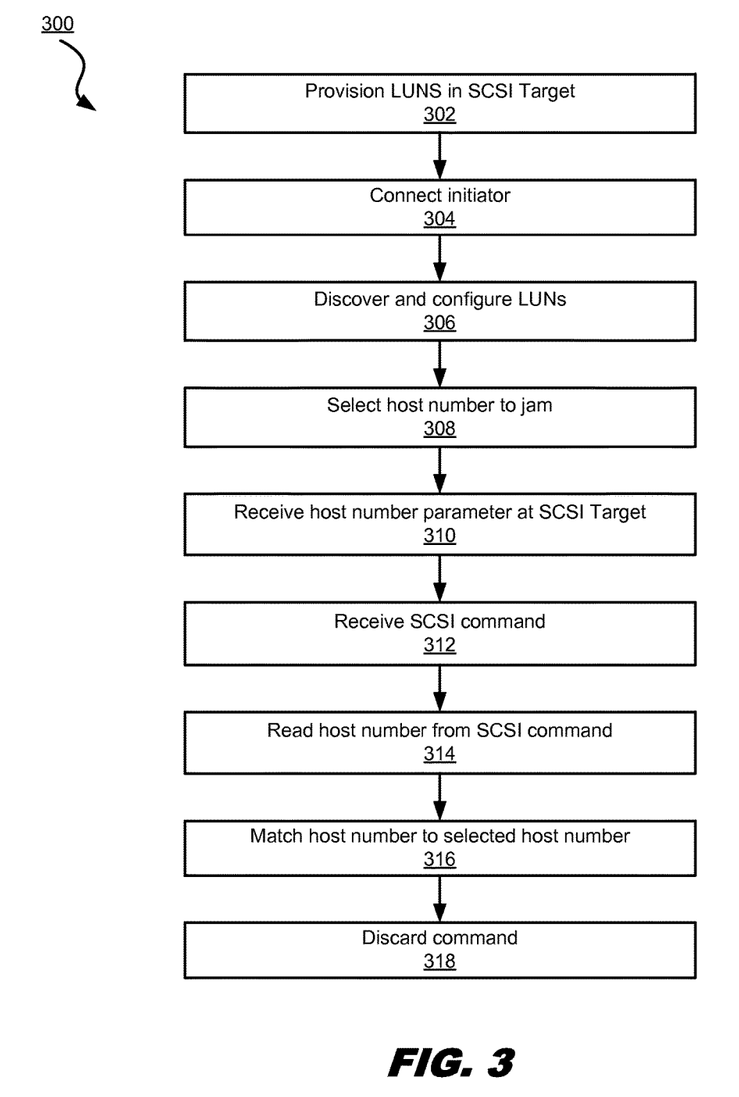
FIG. 3 is a flow diagram illustrating a method for jamming a SCSI command, in accordance with various examples of the present disclosure.

FIG. 3 is a flow diagram illustrating a method for jamming a SCSI command, according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 300, and that some of the steps described can be replaced, eliminated and/or re-ordered for other embodiments of the method 300. Method 300 may be performed, for example, by one or more automated and/or user-operated software tools.

At action 302, an SCSI target configures LUNS for access by a SCSI initiator, such as by provisioning LUNS, setting masking for the LUNS, providing ACLs for the LUNS and particular SCSI initiators, and so forth. In the present example, the SCSI target configures the LUNs for access based on user commands that are input at a command line interface or graphical user interface. In the present example, the SCSI target also may configure the HBA driver to operate in target mode. Provisioning LUNs may include for example, mapping the LUNs to host numbers that are associated with SCSI initiators, such that the LUNs are accessible to the SCSI initiators that are associated with the host numbers. For example, a SCSI initiator that is associated with a first host number may be assigned to a particular LUN, such that the SCSI initiator may be determined to be authorized to access the particular LUN. In the present example, SCSI initiators include client computers that are operating as SCSI initiators.

At action 304, a connection is established between the SCSI target and a SCSI initiator. For example, a TCP/IP network connection may be established between a server computer configured with the SCSI target and a SCSI initiator computer. The SCSI target and SCSI initiator may also establish a session for the SCSI initiator to send SCSI commands and for the SCSI target to wait for the SCSI commands and to respond to the SCSI commands.

At action 306, the SCSI initiator sends a discovery command to the SCSI target. The SCSI target scans for LUNs and returns the located LUNs to the SCSI initiator. In some examples, the SCSI target filters the returned LUNs based on the configured masking and ACLs, such that the LUNs that the SCSI initiator is authorized to access are returned to the SCSI initiator and the LUNs that the SCSI initiator is not authorized to access are not returned to the SCSI initiator. The SCSI initiator may also communicate with the SCSI target to configure LUNs for the SCSI initiator to access. For example, the SCSI initiator may create volumes and assign LUNs to the volumes.

At action 308, a host number to jam is selected and input to the SCSI target. For example, a user may input a command to display a listing of host numbers and the SCSI initiators with which the host numbers are associated. The user may identify a particular SCSI initiator to jam from the listing, and input the host number associated with that SCSI initiator into the SCSI target. The host number to jam may be input into the SCSI target, by for example, inputting the host number into a file, method or function corresponding to the SCSI target, such that the SCSI target may read the host number.

At action 310, the SCSI target receives the input host number. In some examples, the SCSI target parses the host number from a file. In other examples, the SCSI target parses the host number to jam from a user command entered at a command line or graphical user interface. In some examples, the host number to jam is stored as a variable in memory by the SCSI target. In some examples, the host number to jam defaults to a negative number, such as negative one (−1) to identify that jamming is disabled. In other examples, to disable SCSI command jamming, the host number to jam is set to a negative number, such as negative one. The input host number may also be referred to as a selected host number.

At action 312, the SCSI target receives a SCSI command. In the present example, the SCSI command is received from the SCSI initiator by way of the HBA and the storage stack.

At action 314, the SCSI target identifies the host number that is associated with the SCSI command. In the present example, the SCSI command includes an address that specifies the host number of the originating SCSI originator. In the present example, the SCSI target parses/reads the SCSI command to identify the host number. In some examples, the SCSI target also reads a LUN from the SCSI command, and determines that the host number is authorized to access the LUN. In some examples, the determining is performed by accessing a mapping between the host number and its associated LUNs. In some examples, the mapping is created in step 302 during the provisioning of the LUNs.

At action 316, the SCSI target performs a matching/comparison to determine whether the host number of the originating SCSI originator corresponds to the selected host number to jam that was selected in block 308.

At action 318, based on a comparison identifying a match between the selected host number to jam and the host number associated with the SCSI command, the SCSI target prevents the command from being processed. In some examples, the SCSI target jumps past an instruction to process the command, thus preventing the command from being processed. In some examples, the instructions to prevent the command from being processed are located in a function of a LINUX-IO (LIO) SCSI Target and/or HBA device driver. For example, the function may be the qlt_do_work function of a QLOGIC HBA driver. In other examples, the driver may be an EMULEX or other Fibre Channel driver. Accordingly, at action 316, the SCSI command is prevented from being executed at the block I/O layer. In some examples, prior to preventing the command from being processed, the SCSI target determines that the host number identified in the command is authorized to access the LUN identified in the command, such that the command is prevented despite the host number being authorized to access the LUN. In other examples, the preventing of the command is performed prior to determining whether the host number is authorized to access the LUN. In yet other examples, a determining of whether the host number is authorized to access the LUN is not performed.

In some examples, if the host number does not match the host number to jam the command may be processed at the block I/O layer to perform block level I/O. For example, if the host number to jam is set to negative one or to another host number that does not match the host number associated with the SCSI command, the SCSI command may be passed to the block I/O layer The preventing of the SCSI command from executing may be useful for simulating error conditions, such as a lost SCSI command. In some examples, the SCSI initiator is configured with an error handler that may perform error recovery tasks responsive to detecting the simulated error condition.

Figure 4:
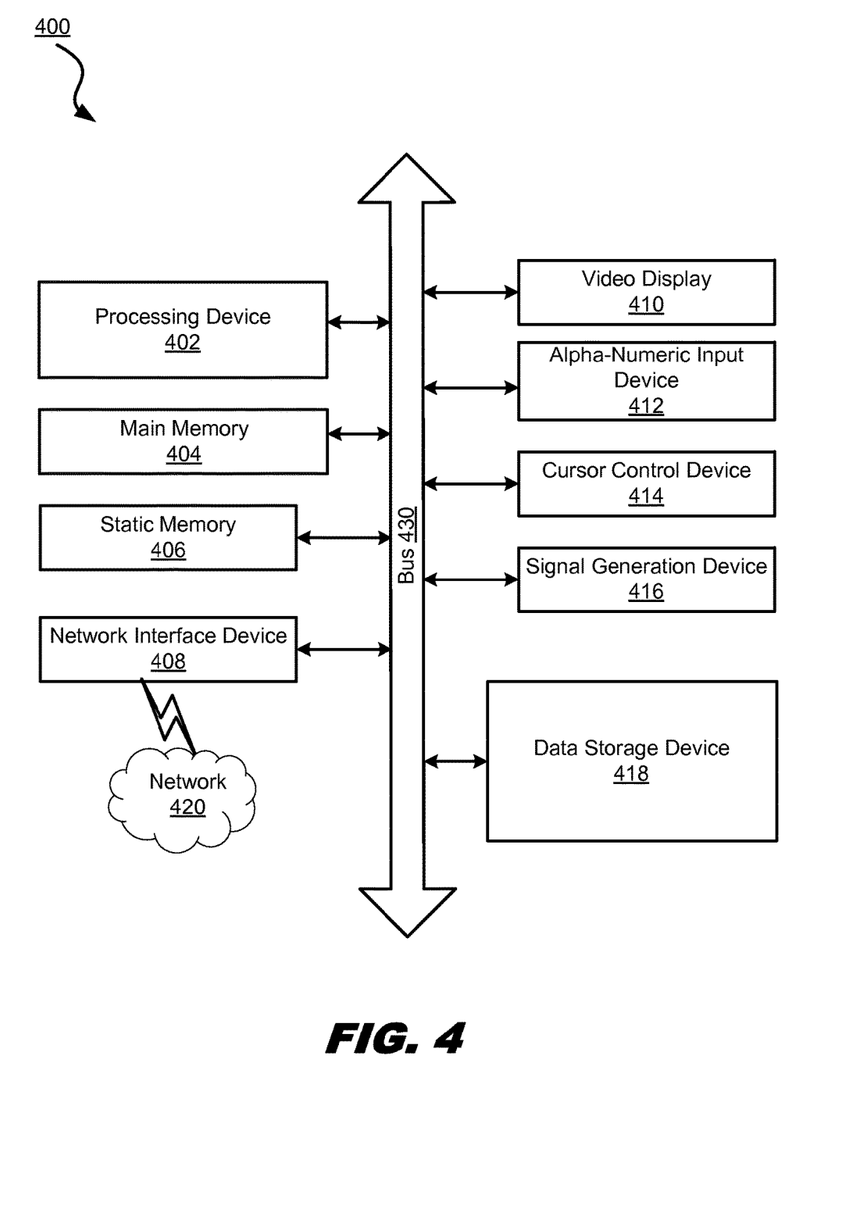
FIG. 4 is a block diagram illustrating a computer system that may perform one or more of the operations described herein.

FIG. 4 illustrates a diagram of a machine in the form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Computer system 400 includes processing device (processor) 402, main memory 404 (e.g., read-only memory (ROM), flash memory, dynamic random access memory (DRAM) such as synchronous DRAM (SDRAM), double data rate (DDR SDRAM), or DRAM (RDRAM), and so forth), static memory 406 (e.g., flash memory, static random access memory (SRAM), and so forth), and data storage device 418, which communicate with each other via bus 430.

Processor 402 represents one or more general-purpose processing devices such as a microprocessor, central processing unit, or the like.

More particularly, processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute instructions for performing the operations and steps discussed herein.

Computer system 400 may further include network interface device 408.

Computer system 400 also may include video display unit 410 (e.g., a liquid crystal display (LCD) or a cathode ray tube (CRT)), alphanumeric input device 412 (e.g., a keyboard), cursor control device 414 (e.g., a mouse), and signal generation device 416 (e.g., a speaker).

Data storage device 418 may include a computer-readable storage medium on which is stored one or more sets of instructions (e.g., software) embodying any one or more of the methodologies or functions described herein. The instructions may also reside, completely or at least partially, within main memory 404 and/or within processor 402 during execution thereof by computer system 400, main memory 404 and processor 402 also constituting computer-readable storage media. The instructions may further be transmitted or received over network 420 via network interface device 408.

While data storage device 418 is shown in an example to be a single medium, the term "data storage device" should be taken to include a single medium or multiple media (e.g., a centralized or distributed database, and/or associated caches and servers) that store the one or more sets of instructions.

The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "measuring," "generating," "setting," "performing," "computing," "comparing," "applying," "creating," "ranking," "classifying," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer-implemented method for processing Small Computer System Interface (SCSI) commands, the method comprising:
provisioning a logical unit number (LUN) on a server computer;
connecting, via a network, the server computer to a client computer;
configuring the LUN to be accessible to a host number that is associated with the client computer;
displaying a listing of the host number and one or more other host numbers and selecting, via a command line interface or graphical user interface, the host number for simulating an error condition;
receiving, by the server computer, a network communication that includes a SCSI command to access the LUN, the network communication originating from the client computer;
reading, by the server computer, a specified host number from the SCSI command;
identifying, by the server computer, that the specified host number from the SCSI command corresponds to the host number for simulating the error condition; and
preventing, based on the identifying, the SCSI command from reaching a block Input/Output (I/O) layer of the server computer, wherein a qlt do work function of a host bus adapter driver includes instructions to cause the preventing.

2. The method of claim 1, wherein the host bus adapter driver is operating in target mode.

3. The method of claim 1, the method further comprising:
receiving a second SCSI command from a second client computer;
reading, by the server computer, a second host number from the second SCSI command;
identifying, by the server, that the second host number does not correspond to the host number for simulating the error condition; and
passing the second SCSI command to the block I/O layer of the server computer.

4. The method of claim 3, the method further comprising:
accessing, at the block I/O layer, one or more disk blocks requested by the second SCSI command from a block device; and
returning the one or more disk blocks to the second client computer.

5. The method of claim 2, the method further comprising:
setting the host bus adapter driver to operate in target mode by a LINUX-IO (LIO) target.

6. The method of claim 1, wherein the network communication is a Fibre Channel frame sent over an Internet Protocol network, wherein the server computer de-encapsulates the SCSI command from the network communication.

7. A non-transitory computer-readable medium having stored thereon computer-readable instructions executable by one or more processors to perform operations comprising:
configuring a host number corresponding to a Small Computer System Interface (SCSI) initiator;
provisioning a logical unit number (LUN) to be accessible to the SCSI Initiator that is associated with the host number;
receiving, via an interface, a selection of the host number from a listing of one or more host numbers as an error simulation host number;
receiving a SCSI command from the SCSI initiator to access the LUN;
matching the error simulation host number with a host number read from the SCSI command; and
responsive to the matching, simulating an error corresponding to the SCSI command, wherein a qlt do work function of a host bus adapter driver includes instructions to cause the simulating of the error by blocking the SCSI command.

8. The non-transitory computer-readable medium of claim 7, the operations further comprising:
determining that the host number read from the SCSI command is authorized to access the LUN.

9. The non-transitory computer-readable medium of claim 7, wherein the host bus adapter driver is operating in target mode.

10. The non-transitory computer-readable medium of claim 7, the operations further comprising:
receiving a second SCSI command from a second SCSI initiator computer;
reading a second host number from the second SCSI command;
determining that the error simulation host number does not match the second host number; and
passing the second SCSI command to a block Input/Output (I/O) layer.

11. The non-transitory computer-readable medium of claim 10, the operations further comprising:
   accessing, at the block I/O layer, one or more disk blocks requested by the second SCSI command from a block device; and
   returning the one or more disk blocks to the second SCSI initiator computer.

12. The non-transitory computer-readable medium of claim 9, the operations further comprising:
   setting the host bus adapter driver to operate in target mode by a LINUX-IO (LIO) target.

13. The non-transitory computer-readable medium of claim 7, wherein the SCSI command is de-encapsulated from at least one of: (1) a Fibre Channel frame; and (2) a Transmission Control Protocol/Internet Protocol (TCP/IP) frame.

14. A system for simulating error conditions of Small Computer System Interface (SCSI) communications, the system comprising:
   a non-transitory memory;
   one or more hardware processors coupled to the non-transitory memory and configured to read instructions from the non-transitory memory;
   a kernel executed by the one or more hardware processors, the kernel including a SCSI target;
   a host bus adapter to receive a SCSI command to access a logical unit number (LUN) via a network, the host bus adapter to pass the SCSI command to the SCSI target;
   the SCSI target to perform operations comprising:
      receiving, via an interface, a selection of a host number identifier to be used for simulating an error condition corresponding to a SCSI initiator;
      reading a host number and the LUN from the SCSI command;
      determining that the host number is authorized to access the LUN;
      matching the host number with the host number identifier for simulating the error condition; and
      preventing, based on the matching, the SCSI command from being passed to a block Input/Output (I/O) layer, wherein a qlt do work function of a host bus adapter driver includes instructions to cause the preventing.

15. The system of claim 14, wherein the host bus adapter driver is configured to operate in target mode by a LINUX-IO (LIO) Target kernel module.

16. The system of claim 14, wherein the SCSI command is de-encapsulated from at least one of: (1) a Fibre Channel frame; and (2) a Transmission Control Protocol/Internet Protocol (TCP/IP) frame.

17. The system of claim 14, wherein the host bus adapter further receives a second SCSI command, and wherein the SCSI target performs operations further comprising:
   reading a second host number;
   failing to match the second host number with the host number identifier for simulating the error condition; and
   passing the second SCSI command to the block I/O layer.

18. The system of claim 17, the SCSI target to perform operations further comprising:
   accessing, at the block I/O layer, one or more disk blocks requested by the second SCSI command from a block device; and
   returning the one or more disk blocks.

19. The system of claim 14, wherein the host bus adapter is operating in target mode.

20. The method of claim 1, further comprising determining that the host number read from the SCSI command is authorized to access the LUN.

* * * * *